UNITED STATES PATENT OFFICE.

ALVIN A. BREITENWISCHER AND GEORGE A. HOWLAND, OF DETROIT, MICHIGAN; SAID BREITENWISCHER ASSIGNOR TO SAID HOWLAND.

ELECTROLYTE.

1,371,466.  Specification of Letters Patent.  Patented Mar. 15, 1921.

No Drawing.  Application filed April 30, 1920. Serial No. 377,952.

*To all whom it may concern:*

Be it known that we, ALVIN A. BREITENWISCHER and GEORGE A. HOWLAND, citizens of the United States, residing at Detroit, in the county of Wayne and State of Michigan, have invented certain new and useful Improvements in Electrolytes, of which the following is a specification.

This invention relates to electrolytes for electrical batteries, and more particularly to batteries used in connection with internal combustion engine starting and the like.

An object of the invention is to provide a suitable electrolyte, composed of such chemicals, which when properly combined will form an electrolyte which is capable of hardening, when allowed to set for a short time.

Another object of the invention is to provide a suitable electrolyte, composed of the various chemicals hereinafter disclosed, which will be highly efficient in use, and inexpensive to manufacture.

Other objects will appear as the description proceeds.

It will be understood that this electrolyte is composed of such chemicals, which when properly mixed, and allowed to stand, will form an approximately solid electrolyte, capable of performing the essentials necessary to each and every kind of electrolyte.

To make the electrolyte, one pound of plaster Paris is first placed in any suitable mixing bowl or board, after which one quarter pound of litharge is added. To this material is added one ounce of carbon dust, mixed together with one ounce of lemon oil. Three and one-half ounces of ground glass is then placed with the other chemicals, or ingredients. One ounce of snake oil, which is the oil obtained from the fatty animal tissue of the snake, is then added to the mass, and the stirring operation commenced.

From this point on, the stirring is continuous, until the electrolyte is ready to be placed in the battery box or container.

One ounce of ammonium chlorid is added, and thoroughly mixed with the mass. Then one ounce of glacial acetic acid is stirred in. After this, one-half pound of iron dust is poured in, and mixed in the same manner. One pint of sulfuric acid is diluted with one pint of water, and poured into the mixing bowl, and the whole mass stirred until thoroughly admixed. And finally one ounce of copper sulfate is added. The resulting mass of the electrolyte, is now in stiff or thick form, and ready to pour into the battery box.

A filler of one quarter of a pound of red lead, slightly admixed with sufficient sulfuric acid to permit molding, is then placed over the electrolyte, and the whole allowed to stand for several days. It will be found that after this time, the electrolyte will have become a solid mass. This electrolyte, furthermore, has the advantage contained in every electrolyte, and is of such consistency, that waste from evaporation and spilling is eliminated.

It is apparent that some equivalents might readily be used in place of the chemicals named, for example cement might be used in the place of plaster Paris. Vinegar might be substituted for glacial acetic acid. Antimony might be substituted for red lead, etc.

It will be understood that we do not limit ourselves to the specific amount of the chemicals, neither do we limit ourselves to the specific elements themselves, as it is obvious to all, that chemicals having the same properties as the ones hereinbefore named might readily be substituted and the same result accomplished.

Having thus described our invention what we claim as new and desire to secure by Letters Patent of the United States is:—

1. An electrolyte consisting of one pound of plaster Paris, one quarter pound of litharge, one ounce of glacial acetic acid, one ounce of snake oil, one ounce of carbon dust, one pint of sulfuric acid, one ounce of copper sulfate, one ounce of ammonium chlorid, one ounce of lemon oil, one quarter pound of red lead, three and one half ounces of ground glass, one half pound of iron dust and one half pint of water, substantially as hereinbefore described.

2. An electrolyte comprising an absorbent material, oxids of lead, and an acid.

3. An electrolyte comprising plaster Paris, the higher oxids of lead, and a metallic sulfate.

4. An electrolyte comprising an absorbent material, oxids of lead, sulfate of copper and iron, and ammonium chlorid.

5. An electrolyte comprising plaster Paris, oxids of lead, metallic salts, and an acid.

6. An electrolyte comprising an absorbent and hardening body, glass, oxids of lead, and an excitant.

7. An electrolyte comprising plaster Paris, ground glass, oxids of lead, acetic acid, sulfuric acid, and metallic salts.

8. An electrolyte comprising oxids of lead, copper sulfate, ammonium chlorid, and an organic compound.

9. An electrolyte comprising oxids of lead, metallic sulfate, ammonium chlorid, and an organic compound insoluble in water.

10. An electrolyte comprising one pound of plaster Paris, one quarter pound of litharge, one ounce of glacial acetic acid, one ounce of snake oil, one ounce of carbon dust, one pint of sulfuric acid, one ounce of copper sulfate, one ounce of ammonium chlorid, one ounce of lemon oil, one quarter pound of red lead, three and one half ounces of ground glass, one half pound of iron dust, and one pint of water.

In testimony whereof we affix our signatures.

ALVIN A. BREITENWISCHER.
GEORGE A. HOWLAND.